US008538058B2

(12) United States Patent
Eberl et al.

(10) Patent No.: US 8,538,058 B2
(45) Date of Patent: Sep. 17, 2013

(54) HEADSET

(76) Inventors: Rolf Eberl, Kincardine (CA); Peter Eberl, Kincardine (CA)

( * ) Notice: Subject to any disclaimer, the term of this patent is extended or adjusted under 35 U.S.C. 154(b) by 961 days.

(21) Appl. No.: 12/469,239

(22) Filed: May 20, 2009

(65) Prior Publication Data

US 2010/0296684 A1 Nov. 25, 2010

(51) Int. Cl.
*H04L 12/50* (2006.01)
*H04Q 11/00* (2006.01)

(52) U.S. Cl.
USPC ................................ 381/370; 84/378; 84/384

(58) Field of Classification Search
None
See application file for complete search history.

(56) References Cited

U.S. PATENT DOCUMENTS 4,039,765 A 8/1977 Tichy et al.
4,453,050 A 6/1984 Enokido
4,472,607 A 9/1984 Houng
4,551,584 A * 11/1985 Mathiasen .................... 381/377
D287,849 S 1/1987 O'Malley et al.
4,668,842 A 5/1987 Yokoyama et al.
D291,198 S 8/1987 Bellini
D316,551 S 4/1991 Ichikawa
5,117,464 A 5/1992 Jones et al.
D331,057 S 11/1992 Isonaga
D342,947 S 1/1994 Totsuka
5,335,285 A 8/1994 Gluz
D351,171 S 10/1994 Tanaka
D351,597 S 10/1994 Nakamura
5,381,486 A * 1/1995 Ludeke et al. ................ 381/375
5,446,788 A 8/1995 Lucey et al.
D371,133 S 6/1996 Andrea
5,751,825 A * 5/1998 Myers et al. .................. 381/118
6,101,260 A 8/2000 Jensen et al.
D459,337 S 6/2002 Mori
6,532,296 B1 * 3/2003 Vaudrey et al. ............... 381/371
6,622,029 B1 * 9/2003 Skulley et al. ............. 455/575.2
6,721,433 B2 4/2004 Sato
6,754,361 B1 6/2004 Hall et al.
D492,941 S 7/2004 Komiyama
D510,335 S 10/2005 Suzuki
D512,983 S 12/2005 Tachikawa
7,155,025 B1 * 12/2006 Weffer .......................... 381/370
7,388,960 B2 * 6/2008 Kuo et al. ..................... 381/186
7,406,172 B2 7/2008 Amae
D597,070 S 7/2009 Zheng
8,050,444 B2 * 11/2011 Smith ........................... 381/379
2001/0050993 A1 * 12/2001 Douglas ....................... 381/71.6

(Continued)

OTHER PUBLICATIONS

Rolf Eberl, et al., Design U.S. Appl. No. 29/337,366 filed May 20, 2009, 8 pages.

*Primary Examiner* — Marlon Fletcher

(57) ABSTRACT

A headset has first and second connectors and first and second earphones. A first electrical pathway extends from a first contact point associated with the first connector to a first contact point associated with said second connector, a second electrical pathway extends from a second contact point associated with the first connector to a second contact point associated with the second connector, and a third electrical pathway extends from a third contact point associated with the first connector to a third contact point associated with the second connector. One or both earphones are connected between the first pathway and the third pathway and neither the first earphone nor the second earphone is connected between the first pathway and the second pathway. The first and second earphones may be mounted at fixed angles such that the earphones project rearwardly and outwardly over, in spaced relation to, and approximately parallel to, ears of a user.

18 Claims, 8 Drawing Sheets

(56) References Cited

U.S. PATENT DOCUMENTS

| | | | | |
|---|---|---|---|---|
| 2004/0037444 | A1* | 2/2004 | Redmer et al. | 381/370 |
| 2005/0157903 | A1* | 7/2005 | Bech | 381/370 |
| 2005/0260953 | A1* | 11/2005 | Lefler et al. | 455/100 |
| 2007/0025561 | A1* | 2/2007 | Gauger et al. | 381/71.6 |
| 2007/0053544 | A1* | 3/2007 | Jhao et al. | 381/384 |
| 2007/0258614 | A1* | 11/2007 | Langberg | 381/379 |
| 2008/0089545 | A1 | 4/2008 | Jannard et al. | |
| 2008/0159581 | A1* | 7/2008 | Ito et al. | 381/378 |
| 2008/0175406 | A1* | 7/2008 | Smith | 381/87 |
| 2009/0268935 | A1* | 10/2009 | Dillinger | 381/371 |
| 2010/0111349 | A1* | 5/2010 | Devlas et al. | 381/380 |
| 2010/0296684 | A1* | 11/2010 | Eberl et al. | 381/378 |
| 2011/0170703 | A1* | 7/2011 | Palma | 381/74 |
| 2011/0170718 | A1* | 7/2011 | Fukuda et al. | 381/151 |
| 2011/0206216 | A1* | 8/2011 | Brunner et al. | 381/74 |
| 2011/0311071 | A1* | 12/2011 | Gauger et al. | 381/74 |
| 2012/0029912 | A1* | 2/2012 | Almagro | 704/226 |
| 2012/0275615 | A1* | 11/2012 | Kelly et al. | 381/74 |

* cited by examiner

HEADSET

BACKGROUND

This invention relates to a headset.

As the number and type of mobile communication and entertainment devices grows so does the variety of headsets used with such devices. A flexible headset configuration would have the advantage of increasing user satisfaction. Further, a headset which allows a user to be exposed to ambient sounds would also be advantageous.

SUMMARY

In one aspect, a headset comprises a first connector, a second connector, a first earphone, and a second earphone. A first electrical pathway extends from a first contact point associated with the first connector to a first contact point associated with the second connector. A second electrical pathway extends from a second contact point associated with the first connector to a second contact point associated with the second connector. A third electrical pathway extends from a third contact point associated with the first connector to a third contact point associated with the second connector. At least one of the first earphone and the second earphone is connected between the first pathway and the third pathway and neither the first earphone nor the second earphone is connected between the first pathway and the second pathway.

In another aspect, a headset is provided with a headband, a first earphone mounted to the headband at a first fixed angle, and a second earphone mounted to the headband at a second fixed angle. The fixed first angle is equal and opposite to the fixed second angle such that the first earphone and the second earphone angle outwardly away from the headband. A first temple pad extends from the headband adjacent the first earphone and a second temple pad extends from said headband adjacent the second earphone. The first and second earphones extend rearwardly such that, in use, with the temple pads positioned at the temples of a wearer, the earphones project rearwardly and outwardly over, in spaced relation to, and approximately parallel to, ears of the wearer. In consequence of this, the wearer remains exposed to ambient sounds and remains able to distinguish the directionality of such sounds.

Other features and advantages will become apparent from the following detailed description in conjunction with the drawings.

BRIEF DESCRIPTION OF THE DRAWINGS

In the figures which illustrate an example embodiment of this invention.

DETAILED DESCRIPTION

Figure 1:
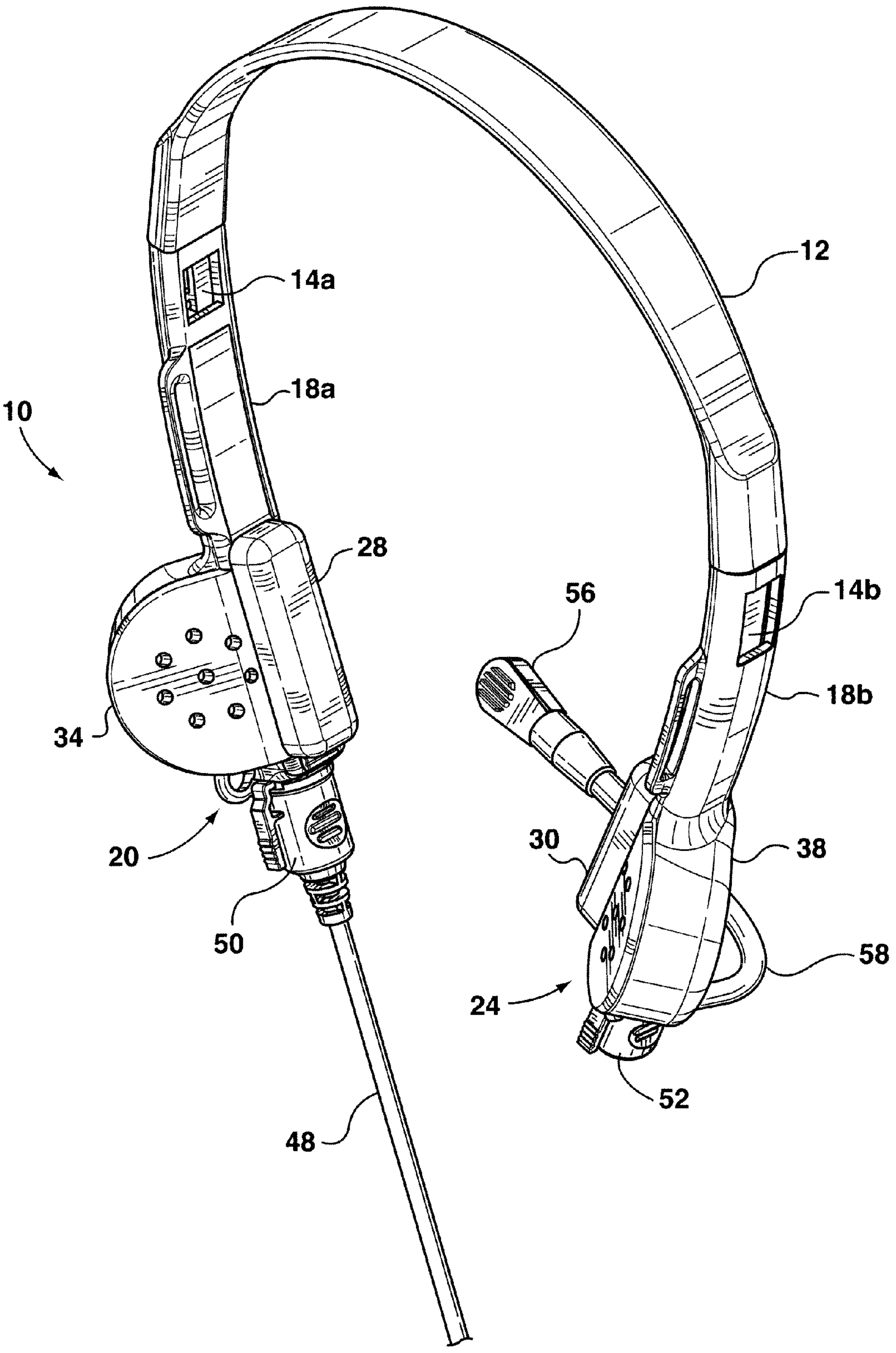
FIG. 1 is a rear perspective view of a headset made in accordance with this invention with attachments.
Figure 2:
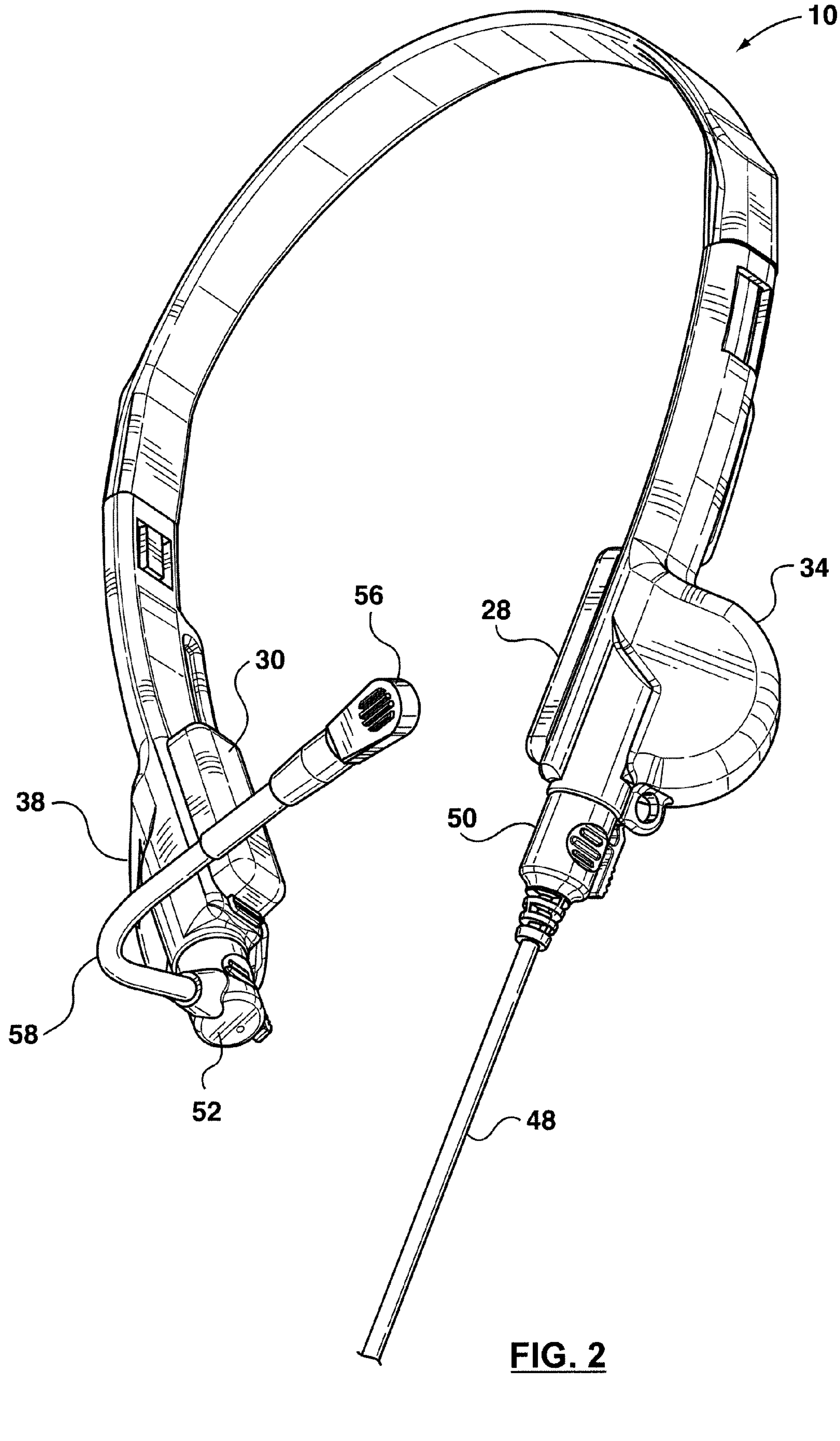
FIG. 2 is a front perspective view of the headset with attachments of FIG. 1.
Figure 3:
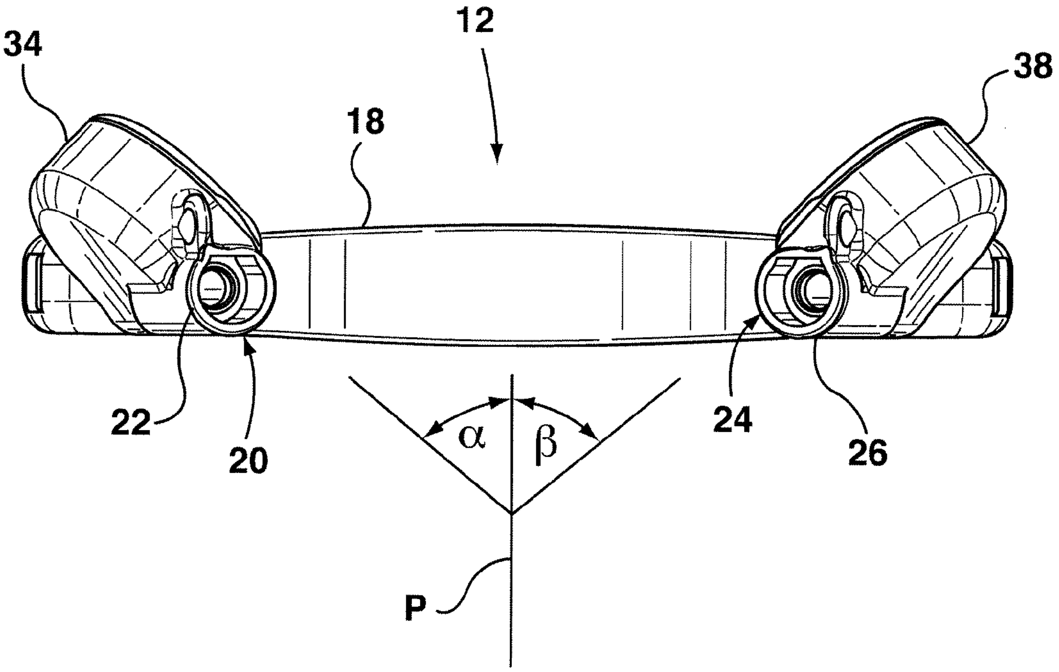
FIG. 3 is a bottom view of the headset of FIG. 1.
Figure 4:
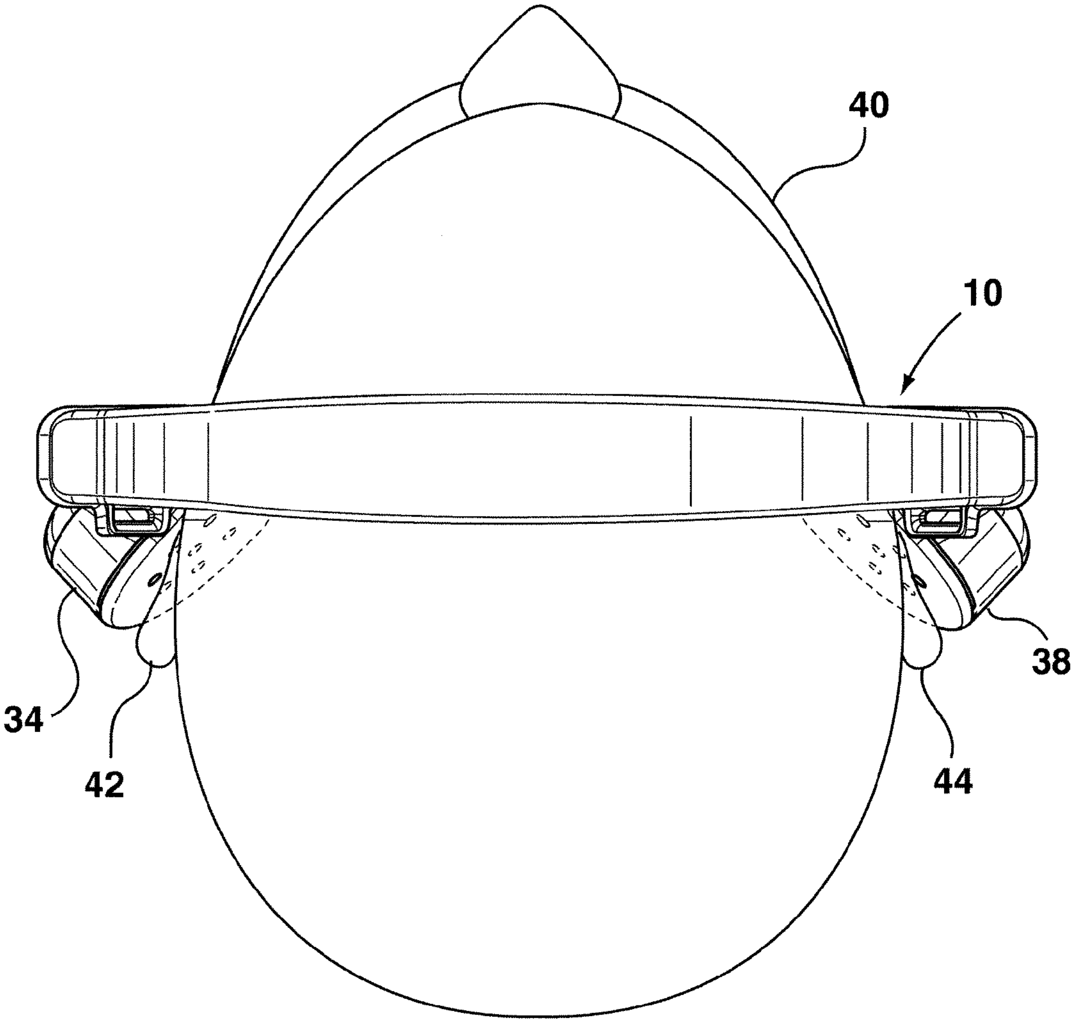
FIG. 4 is a top view of the headset of FIG. 1 shown worn by a user.

Turning to FIGS. 1 to 3, an adjustable headset 10 has a U-shaped headband 12 with a first projecting tang 14*a* slidably received by a first earpiece sleeve 18*a* and a second projecting tang 14*b* slidably received by a second earpiece sleeve 18*b*. The headband terminates at a first end 20 in a first receptacle 22 (FIG. 3) and at a second end 24 in a second receptacle 26 (FIG. 3). An inwardly directed temple pad 28, 30 extends from the headband adjacent each of the first and second ends of the headband. Referencing FIG. 3, a first earphone 34 extends from the headband adjacent end 20 at a fixed first angle $\acute{\alpha}$ to a plane P extending transversely of the headset. A second earphone 38 extends from the headband adjacent end 24 at a second fixed angle β to plane P. Angles $\acute{\alpha}$ and β are equal and opposite acute angle β with respect to plane P, with angle β ranging from between about 30° and 60°. As such the earphones 34, 38 angle outwardly away from the headband 12. With this arrangement, as seen in FIG. 4, when the headset is worn by a wearer 40, the earphones 34, 38 are positioned over but spaced from, and more or less parallel to, the ears 42, 44 of the wearer. Because the earphones are spaced from a wearer's ears, the wearer will not only remain exposed to ambient sounds when wearing the headset but will also continue to be able to distinguish the directionality of ambient sounds. This increases safety for a wearer as well as enhancing the ability of the wearer to orally communicate with a nearby person.

As seen in FIGS. 1 and 2, a plug 50 may be connected to receptacle 22 (FIG. 3) and a plug 52 may be connected to receptacle 26 (FIG. 3). A cord 48 may extend from plug 50 which cord is connected to a device, such as a cell phone, a handheld radio, a personal entertainment device (as, for example, an MP-3 player), or other device which may be used with the headset. Plug 52 is assembled with a microphone 56 on a gooseneck boom 58. The gooseneck boom is flexible to allow adjustment of the position of the microphone.

Figure 5:
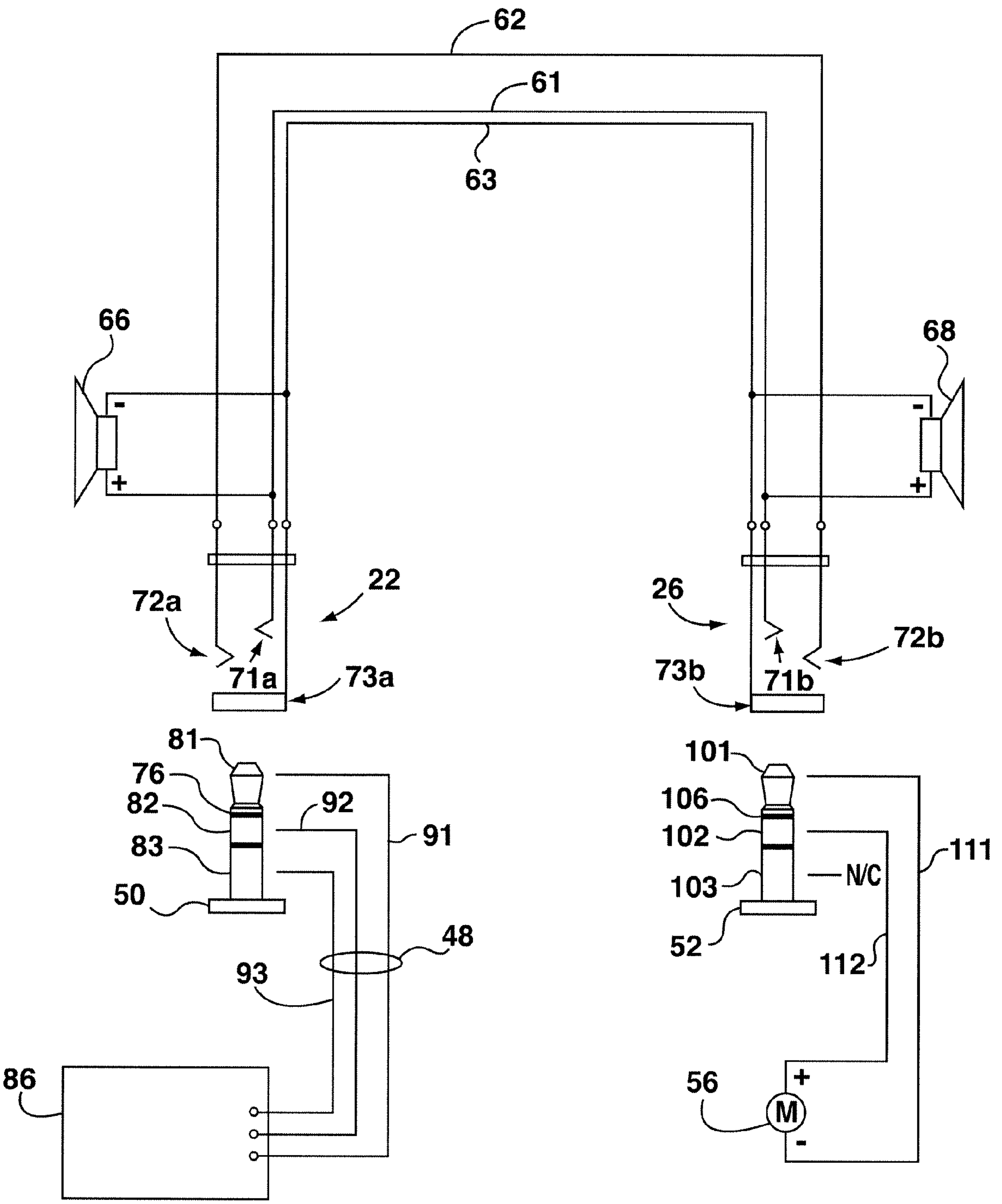
FIG. 5 is a schematic diagram of the headset of FIG. 1 with attachments in accordance with a first embodiment.

Turning to FIG. 5, headset 10 may be wired as follows. A first electrical pathway 61 extends from a first, tip, contact point 71*a* associated with the first receptacle 22 to a first, tip, contact point 71*b* associated with the second receptacle 26. A second electrical pathway 62 extends from a second, medial, contact point 72*a* associated with the first receptacle 22 to a second, medial, contact point 72*b* associated with the second receptacle 26 and a third electrical pathway 63 extends from a third, sleeve, contact point 73*a* associated with the first receptacle 22 to a third, sleeve, contact point 73*b* associated with the second receptacle 26.

Notably, the first, tip, contact point 71*a* associated with the first receptacle 22 is located at a corresponding location to the tip contact point 71*b* associated with the second receptacle 26. Similarly, the second, medial, point 72*a* associated with the first receptacle 22 is located at a corresponding location to the second point 72*b* associated with the second receptacle 26, and the sleeve contact point 73*a* associated with the first receptacle 22 is located at a corresponding location to the sleeve contact point 73*b* associated with the second receptacle 26.

The speaker 66 which is part of the first earphone 34 (FIG. 1) is connected between the first pathway 61 and the third pathway 63. Similarly, the speaker 68 which is part of the second earphone 38 (FIG. 1) is connected between the first pathway 61 and the third pathway 63.

Plug 50 has three electrically conductive zones separated by non-conducting rings 76: a first, apical, zone 81, a second, medial, zone 82, and a third, basal, zone 83. A wire 91 of cord 48 (FIG. 1) is connected between the first zone 81 and a ground (common) connection of a device 86 with which the headset is used. A wire 92 of the cord is connected between the second zone 82 of the plug and a microphone input of the device 86. A wire 93 of the cord is connected between the third zone 83 of the plug and an audio source of the device 86. (If the device with which the headset is used lacked a microphone input, wire 92 would simply be unterminated.)

Plug 52 has three electrically conductive zones separated by non-conducting rings 106: a first zone 101, second zone 102, and third zone 103. The first zone 101 connects to the ground side of microphone 56 via wire 111 and the second zone 102 connects to the other side of the microphone through wire 112. The third conductive zone 103 is unterminated.

Notably, the first conductive zone 81 of plug 50 is located at the same position (namely the tip) of plug 50 as is the first conductive zone 101 of plug 52. Similarly, the second conductive zone 82 of plug 50 is located at the same position (namely the middle) of plug 50 as is the second conductive zone 102 of plug 52.

With this arrangement, when (as seen in FIG. 1) plug 50 is plugged into receptacle 22, the first zone 81 of the plug is electrically connected to first contact point 71*a* of the receptacle, the second zone 82 of the plug is electrically connected to the second contact point 72*a* of the receptacle, and the third zone 83 of the plug is electrically connected to third contact point 73*a* of the receptacle. In consequence, audio signals on wire 93 are connected to the third electrical pathway 63 of the headset and, therefore, to speakers 66 and 68. Additionally, any signals on the second electrical pathway 62 are directed on wire 92 to the microphone input of device 86. The third electrical pathway is common to both the microphone input and the speakers and completes both electrical circuits.

With (as seen in FIG. 1) plug 52 plugged into receptacle 26, first zone 101 of the plug is electrically connected to first contact point 71*b* of the receptacle, second zone 102 of the plug is electrically connected to the second contact point 72*b* of the receptacle, and third zone 103 of the plug is electrically connected to third contact point 73*b* of the receptacle. In consequence, audio signals from the microphone 56 are connected to the second electrical pathway 62 of the headset and, therefore, to wire 92 of plug 50, assuming that plug 50 is plugged into receptacle 22.

Figure 6:
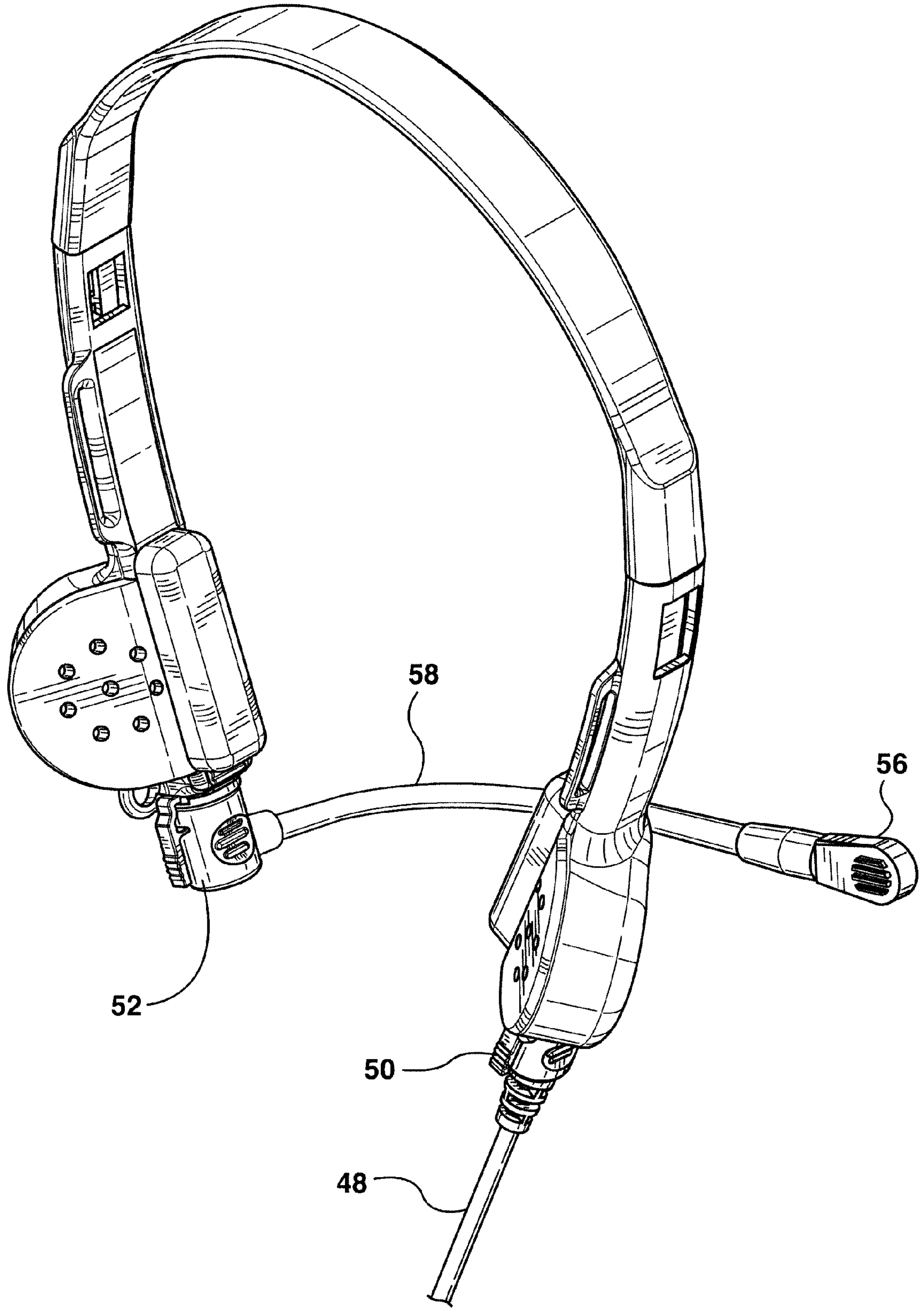
FIG. 6 is a rear perspective view of the headset of FIG. 1 with different attachments.

Notably, rather than plugging plug 50 into receptacle 22, this plug could be plugged into receptacle 26 and the first 91, second 92, and third 93 wires from the plug would still be connected to the first 61, second 62, and third 63 electrical pathways of the headset. Similarly, plug 52 could be plugged into receptacle 22 and the first 111 and second 112 wires associated with the plug would still be connected to the first 61 and second 62 electrical pathways of the headset. FIG. 6 illustrates headset 10 with plug 50 plugged into receptacle 26 and plug 52 plugged into receptacle 22. In FIG. 6, the boom 58 of microphone 56 has been bent around so that the microphone will lie in front of the mouth of a user. Thus, headset 10 can accommodate a user preference for the microphone to extend from the left side of his face or from the right side of his face. The headset can also accommodate a user preference for the cord 48 to extend down from the left side of his head or the right side of his head.

Figure 7:
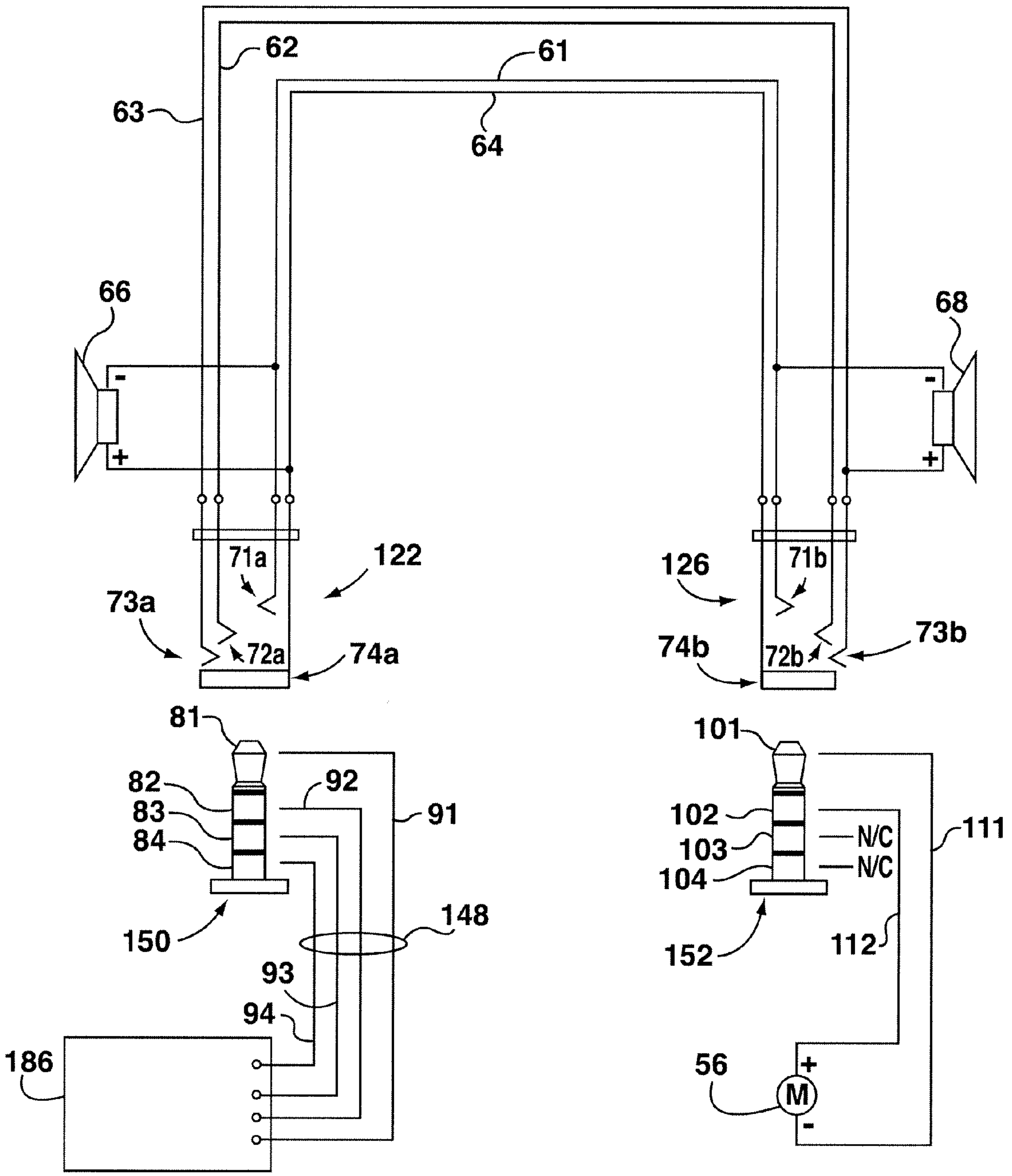
FIG. 7 is a schematic diagram of the headset of FIG. 1 with attachments in accordance with a second embodiment.

FIG. 7 illustrates an alternate wiring for the headset wherein like parts to the wiring of FIG. 5 have been given like reference numerals. Turning to FIG. 7, in addition to first 71*a*, 71*b*; second 72*a*, 72*b*; and third 73*a*, 73*b* contact points on receptacles 122 and 126, respectively, each receptacle has a fourth contact point 74*a*, 74*b* which connects to a fourth electrical pathway 64 of the headset. With this arrangement, speaker 66 connects across the first and fourth pathways 61, 64 and speaker 68 connects across the first and third pathways 61, 63.

The headset wiring of FIG. 7 may be used with the plug 50 and device 86 of FIG. 5. In such instance, the third zone 83 of the plug 50 will be electrically connected to both the third and fourth points 73*a*, 74*a* of receptacle 122. Consequently, both pathways 63 and 64 will be connected to this third zone of the plug and so, therefore, speakers 66 and 68 will be simultaneously connected to this third zone. Alternatively, plug 50 may be replaced by plug 150 which has a fourth zone 84 such that one audio signal is supplied by a device 186 to the third zone 83 and a second audio signal is supplied by the device 186 to the fourth zone 84. The audio signal supplied to the third zone will be applied to speaker 68 and the audio signal supplied to the fourth zone will be applied to speaker 66. In this way, device 186 may supply a stereo signal to the speakers.

The headset wiring of FIG. 7 could not be used with the plug 52 of FIG. 5 since the unterminated third zone 103 would short the third 63 and fourth 64 pathways. Therefore, a plug 152 is used instead. Plug 152 has a first zone 101 connected via wiring 111 to one side of microphone 56, a second zone 102 connected via wiring 112 to the other side of the microphone and unterminated electrically isolated zones 103 and 104.

As with the wiring of FIG. 5, plugs 150 (or 50) and 152 can each be inserted in either one of receptacles 122 and 126.

Figure 8:
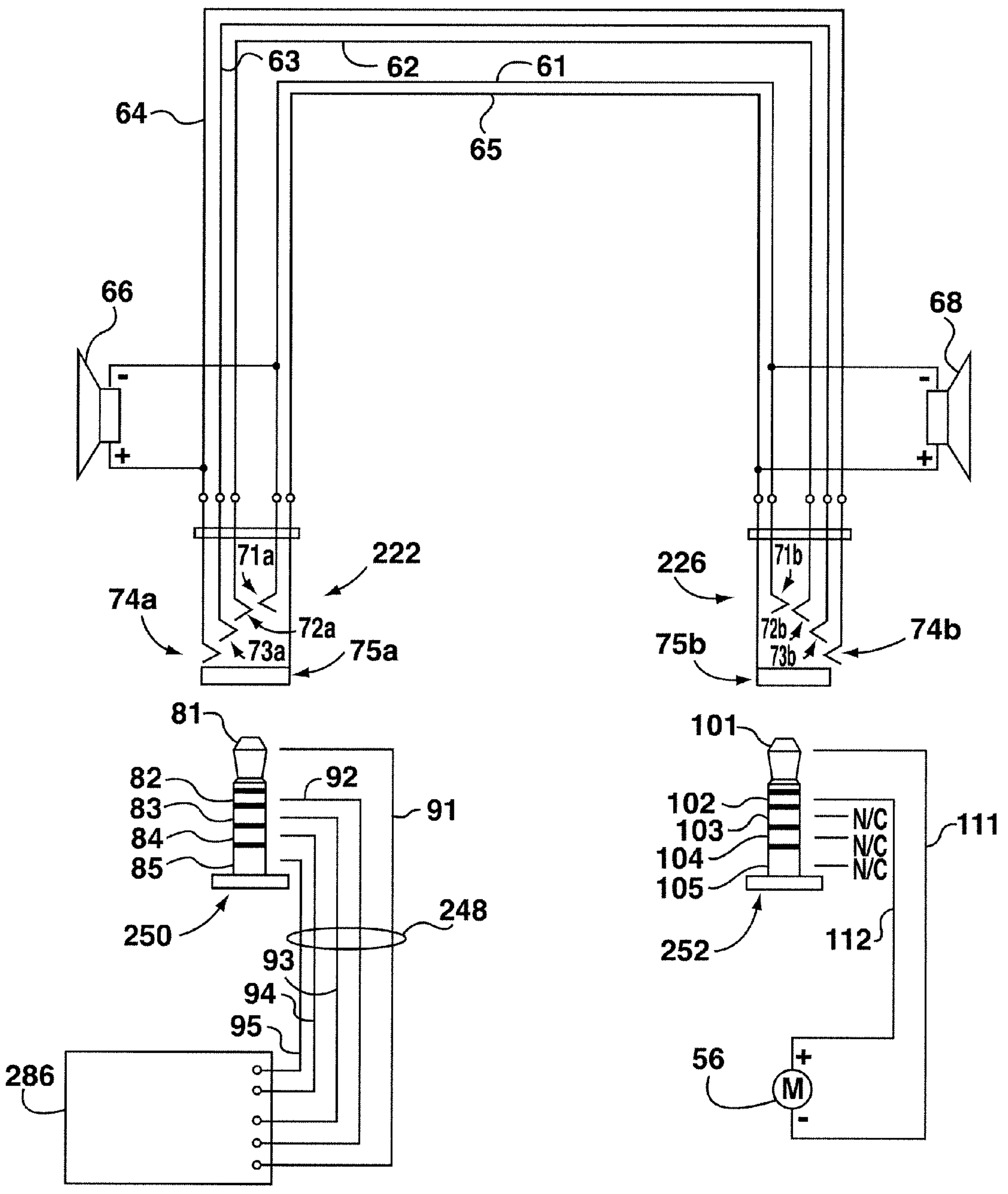
FIG. 8 is a schematic diagram of the headset of FIG. 1 with attachments in accordance with a third embodiment.

FIG. 8 illustrates a further wiring for the headset wherein like parts to the wiring of FIG. 7 have been given like reference numerals. Turning to FIG. 8, in addition to first 71*a*, 71*b*; second 72*a*, 72*b*; third 73*a*, 73*b*; and fourth 74*a*, 74*b* contact points on receptacles 222 and 226, respectively, each receptacle has a fifth contact point 75*a*, 75*b* which connects to a fifth electrical pathway 65 of the headset. With this arrangement, speaker 66 connects across the first and fourth pathways 61, 64 and speaker 68 connects across the first and fifth pathways 61, 65.

The headset wiring of FIG. 8 may be used with plug 250 which has a fifth zone 85 such that one audio signal is supplied by a device 286 to the fourth zone 84 and a second audio signal is supplied by the device 286 to the fifth zone 85. The audio signal supplied to the fourth zone will be applied to speaker 66 and the audio signal supplied to the fifth zone will be applied to speaker 68. In this way, device 286 may supply a stereo signal to the speakers. The third zone 83, which is connected to wire 93 of cord 248 may be connected to an alternate application of device 286 such as a voltage supply for light emitting diodes (LEDs) on the headset or, if unused, may simply be connected to ground.

The microphone 56 is associated with a plug 252 which has a first zone 101 connected via wiring 111 to one side of microphone 56, a second zone 102 connected via wiring 112 to the other side of the microphone and unterminated electrically isolated zones 103, 104, and 105.

As with the wiring of FIG. 5, plugs 250 and 252 can each be inserted in either one of receptacles 222 and 226.

In alternate embodiments, the male and female connectors could be reversed. Thus, the described plugs could project from the headset 10 and the described receptacles could terminate the attachments (e.g., cord 48 and microphone 56). In place of the described receptacle and plug connectors other connector pairs could be substituted, such as miniature circular connectors or mixed gender connectors.

Other attachments than those shown could be provided. For example, a plug could be coupled with a short range transceiver (e.g., a BLUETOOTH™ transceiver) in place of connection cord 48.

Other modifications will be apparent to those skilled in the art and, therefore, the invention is defined in the claims.

What is claimed is:

1. A headset comprising:

a first connector, said first connector being one of a male plug and a female receptacle;

a second connector, said second connector being a male plug if said first connector is a male plug and said second connector being a female receptacle if said first connector is a female receptacle;

a first earphone having a first earphone speaker;

a second earphone having a second earphone speaker;

a first electrical pathway extending from a first contact point of said first connector to a first contact point of said second connector;

a second electrical pathway extending from a second contact point of said first connector to a second contact point of said second connector;

a third electrical pathway extending from a third contact point of said first connector to a third contact point of said second connector;

at least one of said first earphone speaker and said second earphone speaker electrically connected between said first pathway and said third pathway and neither said first earphone speaker nor said second earphone speaker electrically connected between said first pathway and said second pathway.

2. The headset of claim 1 wherein said first earphone speaker is connected between said first pathway and said third pathway and further comprising a fourth electrical pathway from a fourth contact point of said first connector to a fourth contact point of said second connector and wherein said second earphone speaker is connected between said first pathway and said fourth pathway.

3. The headset of claim 1 wherein said first contact point of said first connector is located at a corresponding location to said first contact point of said second connector, said second contact point of said first connector is located at a corresponding location to said second contact point of said second connector, and said third contact point of said first connector is located at a corresponding location to said third contact point of said second connector so that a complementary connector which, when connected to said first connector, is electrically connected to said first contact point of said first connector, said second contact point of said first connector, and said third contact point of said first connector is, when electrically connected to said second connector, electrically connected to said first contact point of said second connector, said second contact point of said second connector, and said third contact point of said second connector.

4. The headset of claim 2 wherein said first contact point of said first connector is located at a corresponding location to said first contact point of said second connector, said second contact point of said first connector is located at a corresponding location to said second contact point of said second connector, said third contact point of said first connector is located at a corresponding location to said third contact point of said second connector, and said fourth contact point of said first connector is located at a corresponding location to said fourth contact point of said second connector so that a connector which, when connected to said first connector, is electrically connected to said first contact point of said first connector, said second contact point of said first connector, said third contact point of said first connector, and said fourth contact point of said first connector is, when connected to said second connector, electrically connected to said first contact point of said second connector, said second contact point of said second connector, said third contact point of said second connector, and said fourth contact point of said second connector.

5. The headset of claim 3 wherein each of said first connector and said second connector is a receptacle and wherein said complementary connector is a plug configured for reception in each said receptacle.

6. The headset of claim 3 further comprising a microphone and complementary connector assembly where said microphone has one side electrically connected to a first contact point on said complementary connector and another side electrically connected to a second contact point on said complementary connector such that, when said complementary connector is plugged into either said first connector or said second connector, said microphone is connected across said first electrical pathway and said second electrical pathway.

7. The headset of claim 1 further comprising a generally U-shaped headband having said first connector at a first end and said second connector at an opposite second end.

8. The headset of claim 7 further comprising a first temple pad adjacent said first end and a second temple pad adjacent said second end.

9. The headset of claim 8 wherein said first earphone is mounted to said headband adjacent said first end at a fixed first angle and said second earphone is mounted to said headband adjacent said second end at a fixed second angle.

10. The headset of claim 9 wherein said fixed first angle is equal and opposite to said fixed second angle such that said first earphone and said second earphone angle outwardly away from said headband.

11. The headset of claim 10 wherein said first angle ranges between thirty and sixty degrees to a plane transverse to said headset.

12. The headset of claim 10 wherein said first earphone and said second earphone extend rearwardly from said temple pads such that, in use, with said temple pads positioned at temples of a wearer, said earphones project rearwardly and outwardly over, in spaced relation to, and approximately parallel to, ears of said wearer whereby said wearer remains exposed to ambient sounds and remains able to distinguish directionality of ambient sounds.

13. The headset of claim 1 wherein both said first earphone and said second earphone are connected between said first pathway and said third pathway.

14. A headset comprising:

a first connector, said first connector being one of a male plug and a female receptacle;

a second connector, said second connector being a male plug if said first connector is a male plug and said second connector being a female receptacle if said first connector is a female receptacle;

a first earphone having a first earphone speaker;

a second earphone having a second earphone speaker;

a first electrical pathway extending from a first contact point associated with said first connector to a first contact point associated with said second connector, said first contact point associated with said first connector located at a corresponding location to said first contact point associated with said second connector;

a second electrical pathway extending from a second contact point associated with said first connector to a second contact point associated with said second connector, said second contact point associated with said first connector located at a corresponding location to said second contact point associated with said second connector;

a third electrical pathway extending from a third contact point associated with said first connector to a third contact point associated with said second connector, said third contact point associated with said first connector located at a corresponding location to said third contact point associated with said second connector;

so that a complementary connector which, when connected to said first connector, is electrically connected to said first contact point associated with said first connector, said second contact point associated with said first connector, and said third contact point associated with said first connector is, when electrically connected to said second connector, electrically connected to said first contact point associated with said second connector, said second contact point associated with said second connector, and said third contact point associated with said second connection;

at least one of said first earphone speaker and said second earphone speaker electrically connected between said first pathway and said third pathway and neither said first earphone speaker nor said second earphone speaker electrically connected between said first pathway and said second pathway;

said first connector and said second connector for selectively receiving an audio device complementary connector such that said first pathway and said third pathway are connected across an audio input of said audio device and said first pathway and said second pathway are connected across a microphone input of said audio device;

a microphone and microphone complementary connector assembly where said microphone has one side electrically connected to a first contact point on said microphone complementary connector and another side electrically connected to a second contact point on said microphone complementary connector such that, when said microphone complementary connector is plugged into either said first connector or said second connector, said microphone is connected across said first electrical pathway and said second electrical pathway, whereby a user may selectively connect an audio device to one of said first connector and said second connector and said microphone and microphone complementary connector assembly to another of said first connector and said second connector.

15. The headset of claim 14 wherein said first earphone speaker is connected between said first pathway and said third pathway and further comprising a fourth electrical pathway from a fourth contact point associated with said first connector to a fourth contact point associated with said second connector and wherein said second earphone speaker is connected between said first pathway and said fourth pathway.

16. The headset of claim 14 further comprising a generally U-shaped headband having said first connector at a first end and said second connector at an opposite second end.

17. The headset of claim 16 wherein said first earphone is mounted to said headband adjacent said first end at a fixed first angle and said second earphone is mounted to said headband adjacent said second end at a fixed second angle.

18. The headset of claim 17 wherein said fixed first angle is equal and opposite to said fixed second angle such that said first earphone and said second earphone angle outwardly away from said headband.

* * * * *